(12) United States Patent
Brothers

(10) Patent No.: US 6,908,508 B2
(45) Date of Patent: *Jun. 21, 2005

(54) SETTABLE FLUIDS AND METHODS FOR USE IN SUBTERRANEAN FORMATIONS

(75) Inventor: Lance E. Brothers, Chickasha, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/759,815

(22) Filed: Jan. 16, 2004

(65) Prior Publication Data

US 2004/0244650 A1 Dec. 9, 2004

Related U.S. Application Data

(63) Continuation-in-part of application No. 10/454,080, filed on Jun. 4, 2003, now Pat. No. 6,689,208.

(51) Int. Cl.$^7$ ............................ C04B 7/34; E21B 33/38; E21B 33/14

(52) U.S. Cl. ........................ 106/794; 106/681; 106/793; 106/811; 166/292; 166/293; 405/266; 405/267; 507/140; 507/269

(58) Field of Search ................................. 106/681, 793, 106/794, 811; 166/292, 293; 405/266, 267; 507/140, 269

(56) References Cited

U.S. PATENT DOCUMENTS

| | | | |
|---|---|---|---|
| 3,359,225 A | 12/1967 | Weisend | 260/29.6 |
| 3,959,003 A | 5/1976 | Ostroot et al. | 106/93 |
| 4,015,991 A | 4/1977 | Persinski et al. | 106/90 |
| 4,120,360 A | 10/1978 | Messenger | 166/293 |
| 4,215,001 A | 7/1980 | Elphingstone et al. | 252/8.55 C |
| 4,231,882 A | 11/1980 | Elphingstone et al. | 252/8.55 C |
| 4,234,344 A | 11/1980 | Tinsley et al. | 106/88 |
| 4,460,052 A | 7/1984 | Gockel | 175/72 |
| 4,498,995 A | 2/1985 | Gockel | 252/8.5 LC |
| 4,515,216 A | 5/1985 | Childs et al. | 166/293 |
| 4,515,635 A | 5/1985 | Rao et al. | 106/90 |
| 4,524,828 A | 6/1985 | Sabins et al. | 166/293 |
| 4,555,269 A | 11/1985 | Rao et al. | 106/90 |
| 4,676,317 A | 6/1987 | Fry et al. | 166/293 |
| 4,703,801 A | 11/1987 | Fry et al. | 166/293 |
| 4,818,288 A | 4/1989 | Aignesberger | 106/90 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,151,203 A | 9/1992 | Riley et al. | 252/8.551 |
| 5,238,064 A | 8/1993 | Dahl et al. | 166/293 |
| 5,263,542 A | 11/1993 | Brothers | 166/293 |
| 5,340,397 A | 8/1994 | Brothers | 106/727 |
| 5,447,197 A | 9/1995 | Rae et al. | 166/293 |
| 5,547,506 A | 8/1996 | Rae et al. | 106/730 |
| 5,725,652 A | 3/1998 | Shulman | 106/677 |
| 6,063,738 A | 5/2000 | Chatterji et al. | 507/269 |
| 6,138,759 A | 10/2000 | Chatterji et al. | 166/293 |
| 6,156,808 A | 12/2000 | Chatterji et al. | 516/116 |
| 6,173,778 B1 | 1/2001 | Rae et al. | 166/293 |
| 6,220,354 B1 | 4/2001 | Chatterji et al. | 166/293 |
| 6,241,815 B1 | 6/2001 | Bonen | 106/735 |
| 6,268,406 B1 | 7/2001 | Chatterji et al. | 523/130 |
| 6,308,777 B2 | 10/2001 | Chatterji et al. | 166/293 |
| 6,315,042 B1 | 11/2001 | Griffith et al. | 166/291 |
| 6,457,523 B1 | 10/2002 | Vijn et al. | 166/293 |
| 6,457,524 B1 | 10/2002 | Roddy | 166/293 |
| 6,500,252 B1 | 12/2002 | Chatterji et al. | 106/644 |
| 6,516,883 B1 | 2/2003 | Chatterji et al. | 166/293 |
| 6,524,384 B2 | 2/2003 | Griffith et al. | 106/705 |
| 6,569,232 B2 | 5/2003 | Castro et al. | 106/644 |
| 6,610,140 B2 | 8/2003 | Vijn et al. | 106/738 |
| 6,666,268 B2 | 12/2003 | Griffith et al. | 166/292 |
| 6,668,929 B2 | 12/2003 | Griffith et al. | 166/292 |
| 6,689,208 B1 | 2/2004 | Brothers | 106/794 |
| 2003/0116065 A1 | 6/2003 | Griffith et al. | 106/705 |
| 2003/0121456 A1 | 7/2003 | Griffith et al. | 106/724 |
| 2003/0121660 A1 | 7/2003 | Griffith et al. | 166/292 |

OTHER PUBLICATIONS

Halliburton brochure entitled "CFR–3 Cement Friction Reducer Dispersant" dated 1998.*, no month.
Halliburton brochure entitled "Halad®–344 Fluid–Loss Additive" dated 1998.*, no month.
Halliburton brochure entitled "Halad®–413 Fluid–Loss Additive" dated 1999.*, no month.
Halliburton brochure entitled "Spherelite Cement Additive" dated 1999.*, no month.
Halliburton brochure entitled "HALAD®–700 Fluid–Loss Additive" dated 2000.*, no month.
Halliburton brochure entitled "Hi–Dense® Weight Additives" dated 1998.*, no month.
Halliburton brochure entitled "HR®–5 Cement Additive" dated 1998.*, no month.
Halliburton brochure entitled "WG–17 LXP Free–Water Control Agent" Dated 1999.*, no month.
Derwent Publication XP–002268116 entitled "Artificial Light Weight Aggregate For Concrete," abstract of JP63–144152 Jun. 1988.

*Primary Examiner*—Anthony J. Green
(74) *Attorney, Agent, or Firm*—Craig W. Roddy; Baker Botts L.L.P.

(57) ABSTRACT

The present invention relates to subterranean operations, and more particularly, to settable fluids comprising vitrified shale and hydrated lime and methods of using such settable fluids in subterranean applications. In an exemplary embodiment, the settable fluids of the present invention may be used as a displacement fluid. In another exemplary embodiment, the settable fluids of the present invention may be used as a drilling fluid.

64 Claims, No Drawings

SETTABLE FLUIDS AND METHODS FOR USE IN SUBTERRANEAN FORMATIONS

CROSS-REFERENCE TO RELATED APPLICATIONS

This application is a continuation-in-part of U.S. patent application Ser. No. 10/454,080 entitled "Lightweight Cement Compositions and Methods of Cementing in Subterranean Formations," filed Jun. 4, 2003, now U.S. Pat. No. 6,689,208, incorporated by reference herein for all purposes, and from which priority is claimed pursuant to 35 U.S.C. § 120.

BACKGROUND OF THE INVENTION

The present invention relates to subterranean operations, and more particularly, to settable fluids comprising vitrified shale and hydrated lime, and methods of using such settable fluids in subterranean applications.

During the drilling of a well bore in a subterranean formation, a drilling fluid may be circulated through a drill pipe and drill bit into the well bore, and subsequently flow upward through the well bore to the surface. The drilling fluid functions, inter alia, to cool the drill bit, lubricate the rotating drill pipe to prevent it from sticking to the walls of the well bore, prevent blowouts by providing hydrostatic pressure to counteract the sudden entrance into the well bore of high-pressure formation fluids, and remove drilled cuttings from the well bore. While drilling fluids are generally not settable, e.g., they do not set into hard impermeable sealing masses when static, drilling fluids may increase in gel strength over time. Typically, after a well bore is drilled to a desired final depth, the drill pipe and drill bit are withdrawn from the well bore and the drilling fluid is left therein so as to, inter alia, provide hydrostatic pressure on permeable formations penetrated by the well bore, thereby preventing the flow of formation fluids into the well bore.

A common subsequent step in completing the well bore usually involves placing a pipe string, e.g., casing, into the well bore. Depending upon factors such as, inter alia, the depth of the well bore and any difficulties in placing the pipe string therein, the drilling fluid may remain relatively static in the well bore for an extended period of time, e.g., up to 2 weeks. During that time, the drilling fluid may progressively increase in gel strength, whereby portions of the drilling fluid in the well bore may become increasingly difficult to displace.

Upon placement of the pipe string in the well bore, primary cementing is typically performed, whereby the pipe string disposed in the well bore is cemented by pumping a cement composition through the pipe string and into an annulus between the pipe string and the walls of the well bore, thereby displacing the drilling fluid in the annulus. However, if the drilling fluid has developed sufficient gel strength during its residence within the well bore, an operator may be unable to displace all of the drilling fluid with the cement composition. Accordingly, portions of the drilling fluid in the well bore may be bypassed by the cement composition. This is problematic, because the drilling fluid generally is not settable; therefore, formation fluids may enter and flow along the well bore, which generally is highly undesirable.

Operators have attempted to solve this problem by developing settable fluid compositions, inter alia, to displace drilling fluids from well bores promptly after their use. However, these methods generally have not met with success, as conventional settable fluids include blast furnace slag and other hydraulic components that may begin to set at relatively low temperatures, e.g., temperatures less than about 90° F. Also, certain slag-containing settable fluids may be intolerant to cement composition contamination, causing the settable fluids to cement prematurely upon contact with well cement. To counteract this tendency to prematurely set, oftentimes a strong set retarder will be added to the displacement fluid, and the displacement fluid often is separated from the cement composition by a spacer fluid. Furthermore, certain blast furnace slags may have varying compositions and physical properties (e.g., particle size) depending not only upon the supplier of a given batch of blast furnace slag, but also upon the particular furnace and process that produced the batch. This may adversely affect the properties of the settable fluid comprising the blast furnace slag.

SUMMARY OF THE INVENTION

The present invention relates to subterranean operations, and more particularly, to settable fluids comprising vitrified shale and hydrated lime, and methods of using such settable fluids in subterranean applications.

An example of a method of the present invention is a method of using a settable fluid in a subterranean formation comprising the step of placing a displacement fluid comprising vitrified shale and hydrated lime in a well bore in a subterranean formation so as to displace a second fluid therefrom.

Another example of a method of the present invention is a method of producing hydrocarbons in a subterranean formation comprising the step of drilling a well bore in a subterranean formation using a drilling fluid comprising vitrified shale and hydrated lime.

An example of a composition of the present invention is a settable fluid comprising vitrified shale and hydrated lime.

The features and advantages of the present invention will be readily apparent to those skilled in the art upon a reading of the description of the exemplary embodiments which follows.

DETAILED DESCRIPTION OF EXEMPLARY EMBODIMENTS

The present invention relates to subterranean operations, and more particularly, to settable fluids comprising vitrified shale and hydrated lime, and methods of using such settable fluids in subterranean applications.

The settable fluids of the present invention generally comprise water, vitrified shale, and hydrated lime. Optionally, other additives suitable for use in a settable fluid may be added. Generally, the settable fluids of the present invention have a density in the range of from about 11 lbs/gal to about 17 lbs/gal.

The water present in the settable fluids of the present invention may be from any source, provided that it does not contain an excess of compounds that adversely affect other compounds in the settable fluids. For example, a settable fluid of the present invention can comprise fresh water, salt water (e.g., water containing one or more salts dissolved therein), brine (e.g., saturated salt water), or seawater. The water may be present in an amount sufficient to produce a pumpable slurry. Generally, the water is present in the settable fluids of the present invention in an amount in the range of from about 35% to about 60% by weight of the settable fluid. In certain exemplary embodiments, the water is present in the settable fluids of the present invention in an amount in the range of from about 40% to about 50% by weight of the settable fluid.

The hydrated lime is present in the settable fluids of the present invention in an amount sufficient to form calcium silicate hydrates upon reaction with a source of water and a source of vitrified shale. Calcium silicate hydrates, *inter alia*, lend strength to settable fluids when they are allowed to set. More particularly, the hydrated lime is present in the settable fluids in an amount in the range of from about 2% to about 15% by weight of the settable fluid. In certain exemplary embodiments, the hydrated lime is present in the settable fluids in an amount in the range of from about 3% to about 10% by weight of the settable fluid. An example of a suitable hydrated lime is commercially available from Continental Lime, Inc., of Salt Lake City, Utah.

The vitrified shale is present in the settable fluids of the present invention in an amount sufficient to form calcium silicate hydrates upon reaction with a source of water and a source of hydrated lime. More particularly, the vitrified shale is present in the settable fluids in an amount in the range of from about 30% to about 60% by weight of the settable fluid. In certain exemplary embodiments, the vitrified shale is present in the settable fluids in an amount in the range of from about 40% to about 50% by weight of the settable fluid. An example of a suitable vitrified shale is commercially available under the tradename "PRESSUR-SEAL® FINE LCM" from TXI Energy Services, Inc., of Houston, Tex.

Optionally, the settable fluids of the present invention may further comprise a set retarder. Whether a particular application will require the inclusion of a set retarder in a particular settable fluid may depend upon factors including, but not limited to, the bottom hole static temperature of the application. One of ordinary skill in the art, with the benefit of this disclosure, will be able to determine whether a set retarder is appropriate for a particular application. Generally, any set retarder may be used with the settable fluids of the present invention. In certain exemplary embodiments, the set retarders used in the present invention comprise nucleation poisoning agents. Examples of suitable nucleation poisoning agents include, but are not limited to, phosphonic acid derivatives, such as those described in U.S. Pat. No. 4,676,832, the relevant disclosure of which is hereby incorporated. An example of a suitable phosphonic acid derivative is commercially available under the tradename "DEQUEST" from Monsanto Corporation of St. Louis, Mo. In certain other exemplary embodiments, the set retarders used in the present invention comprise lignosulfonates. An example of a suitable lignosulfonate is commercially available under the tradename "HR®-5" from Halliburton Energy Services, Inc., of Duncan, Okla. Where included, the set retarder generally is present in the settable fluids of the present invention in an amount in the range of from about 0.09% to about 0.9% by weight of the settable fluid.

Optionally, the settable fluids of the present invention may further comprise a viscosifying agent. The viscosifying agent may be any component suitable for providing a desired degree of solids suspension. An example of a suitable viscosifying agent is a hydroxyethyl cellulose that is commercially available under the tradename "WG-17" from Halliburton Energy Services, Inc., of Duncan, Okla. One of ordinary skill in the art, with the benefit of this disclosure, will be able to identify a suitable viscosifying agent, as well as the appropriate amount to include, for a particular application.

Optionally, the settable fluids of the present invention may further comprise a weighting agent. Generally, any weighting agent may be used with the settable fluids of the present invention. In certain exemplary embodiments, the weighting agents used in the present invention comprise hematites. An example of a suitable hematite is commercially available under the tradename "Hi-Dense® No. 4" from Halliburton Energy Services, Inc., of Duncan, Okla.

Optionally, the settable fluids of the present invention may further comprise a set accelerator. Generally, any set accelerator may be used with the settable fluids of the present invention. One of ordinary skill in the art, with the benefit of this disclosure, will be able to identify a suitable set accelerator for a particular application. Where used, the set accelerator generally will be present in the settable fluid in an amount in the range of from about 0.5% to about 2% by weight of the settable fluid.

Additional additives optionally may be added to the settable fluids of the present invention as deemed appropriate by one skilled in the art with the benefit of this disclosure. Examples of such additives include, *inter alia*, fluid loss control additives, defoamers, dispersing agents, salts, and formation conditioning agents.

In an exemplary embodiment, the settable fluids of the present invention may be used as a displacement fluid. For example, a displacement fluid of the present invention comprising water, vitrified shale, and hydrated lime may be placed in a well bore that has been drilled (with a drilling fluid) in a subterranean formation so as to partially or completely displace the drilling fluid from the well bore. Generally, after the displacement fluid has been placed in the well bore, a cement composition is subsequently placed in the well bore so as to partially, or completely, displace the displacement fluid therefrom. Any portion of the displacement fluid that is not displaced by the cement composition, and that inadvertently remains within the well bore, will develop sufficient compressive strength so as not to adversely affect the integrity of the resultant cement sheath. Accordingly, an exemplary method of the present invention comprises the step of placing a displacement fluid comprising water, vitrified shale, and hydrated lime in a well bore in a subterranean formation so as to displace a second fluid therefrom. Additional steps include, but are not limited to, placing a casing string within the well bore; placing a cement composition within the well bore so as to displace at least a portion of the displacement fluid therefrom; permitting the cement composition to set therein; and permitting any undisplaced displacement fluid to set therein.

In another exemplary embodiment, the settable fluids of the present invention may be used as a drilling fluid. A drilling fluid of the present invention comprising water, vitrified shale, and hydrated lime may be used to drill a subterranean formation, e.g., by circulating the drilling fluid while drilling a well bore in contact with a drill bit and a subterranean formation. In an exemplary embodiment, the drilling fluid is used to drill a well bore in a subterranean formation, after which casing is placed within the well bore. In this exemplary embodiment, the drilling fluid is permitted to set behind the casing. Accordingly, an exemplary method of the present invention comprises the step of drilling a well bore in a subterranean formation using a drilling fluid comprising water, vitrified shale, and hydrated lime. Additional steps include, but are not limited to, placing a casing string within the well bore; and permitting the drilling fluid to set behind the casing string.

EXAMPLES

To facilitate a better understanding of the present invention, the following examples of some of the exemplary embodiments are given. In no way should such examples be read to limit the scope of the invention.

Example 1

Sample settable fluid compositions of the present invention were prepared comprising 300 grams of vitrified shale, 30 grams of hydrated lime, 2.1 grams of "WG-17" hydroxyethyl cellulose, 300 grams of water, and varying amounts of "HR®-5" lignosulfonate set retarder. The sample compositions were prepared at room temperature, heated in a water bath to 140° F., and subjected to gel strength testing per Appendix A, API RP 13B-2, 2d edition, Dec. 1, 1991, and compressive strength testing per API Specification 10. The results are set forth in the table below.

TABLE 1

| Sample Description | Set Retarder (% by wt. of Shale) | Fluid Time (Days) | Set Time (Days) | Compressive Strength (psi) |
| --- | --- | --- | --- | --- |
| Sample Composition No. 1 | 0.3 | 4 | 5 | 203 |
| Sample Composition No. 2 | 0.4 | 6 | 9 | 146 |
| Sample Composition No. 3 | 0.5 | 8 | 9 | 204 |

"Fluid time" refers to the time during which the slurry possessed a static gel strength of less than 250 pounds per hundred square feet (250 lb/100 ft$^2$). The above example demonstrates, *inter alia*, that the settable fluids of the present invention are suitable for use in subterranean applications.

Example 2

Sample settable fluid compositions of the present invention were prepared comprising 300 grams of vitrified shale, 30 grams of hydrated lime, 2.1 grams of "WG-17" hydroxyethyl cellulose, 300 grams of water, and varying amounts of "HR®-5" lignosulfonate set retarder. The sample compositions were prepared at room temperature, heated in a water bath to 160° F., and subjected to gel strength testing per Appendix A, API RP 13B-2, 2d edition, Dec. 1, 1991, and compressive strength testing per API Specification 10. The results are set forth in the table below.

TABLE 2

| Sample Description | Set Retarder (% by wt. of Shale) | Fluid Time (Days) | Set Time (Days) | Compressive Strength (psi) |
| --- | --- | --- | --- | --- |
| Sample Composition No. 4 | 0.5 | 4 | 5 | 237 |
| Sample Composition No. 5 | 0.6 | 4 | 7 | 287 |
| Sample Composition No. 6 | 0.7 | 8 | 9 | Not Determined |

An additional formulation of Sample Composition No. 4 was prepared, to which about 225 grams of "Hi-Dense® No. 4" were added. This produced a settable fluid having a density of about 15 lb/gallon. It had a fluid time of two days and a set time of three days, with a measured compressive strength of about 294 psi after six days.

The above example demonstrates, *inter alia*, that the settable fluids of the present invention are suitable for use in subterranean applications.

Example 3

Sample settable fluid compositions of the present invention were prepared comprising 300 grams of vitrified shale, 30 grams of hydrated lime, 2.1 grams of "WG-17" hydroxyethyl cellulose, 300 grams of water, and varying amounts of "HR®-5" lignosulfonate set retarder. The sample compositions were prepared at room temperature, heated in a water bath to 190° F., and subjected to gel strength testing per Appendix A, API RP 13B-2, 2d edition, Dec. 1, 1991, and compressive strength testing per API Specification 10. The results are set forth in the table below.

TABLE 3

| Sample Description | Set Retarder (% by wt. of Shale) | Fluid Time (Days) | Set Time (Days) | Compressive Strength (psi) |
| --- | --- | --- | --- | --- |
| Sample Composition No. 7 | 0.5+ | >1 | 3 | Not Determined |
| Sample Composition No. 8 | 0.7 | 3 | 4 | 370 |

The "+" after the set retarder entry for Sample Cement Composition No. 7 indicates that this Sample Composition further comprised 3 grams of a viscosifying agent.

The above example demonstrates, *inter alia*, that the settable fluids of the present invention are suitable for use in subterranean applications.

Therefore, the present invention is well adapted to carry out the objects and attain the ends and advantages mentioned as well as those that are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of using a settable fluid in a subterranean formation comprising the step of placing a displacement fluid comprising vitrified shale and hydrated lime in a well bore in a subterranean formation so as to displace a second fluid therefrom.

2. The method of claim 1 wherein the second fluid is a drilling fluid.

3. The method of claim 1 further comprising the step of placing a casing string within the well bore, wherein the step of placing a casing string within the well bore is performed after the step of placing a displacement fluid comprising vitrified shale and hydrated lime in a well bore in a subterranean formation so as to displace a second fluid therefrom.

4. The method of claim 3 further comprising the step of placing a cement composition within the well bore so as to displace at least a portion of the displacement fluid therefrom, wherein the step of placing a cement composition within the well bore so as to displace at least a portion of the displacement fluid therefrom is performed after the step of placing a casing string within the well bore.

5. The method of claim 4 further comprising the step of permitting the cement composition to set in the well bore.

6. The method of claim 4 further comprising the step of permitting any remaining portion of the displacement fluid in the well bore to set therein.

7. The method of claim 1 wherein the displacement fluid further comprises water, and wherein the water is fresh water, salt water, brine, sea water, or a mixture thereof.

8. The method of claim 7 wherein the water is present in the displacement fluid in an amount sufficient to form a pumpable slurry.

9. The method of claim 8 wherein the water is present in the displacement fluid in an amount in the range of from about 35% to about 60% by weight of the displacement fluid.

10. The method of claim 1 wherein the vitrified shale is present in the displacement fluid in an amount sufficient to form calcium silicate hydrates.

11. The method of claim 10 wherein the vitrified shale is present in the displacement fluid in an amount in the range of from about 30% to about 60% by weight of the displacement fluid.

12. The method of claim 1 wherein the hydrated lime is present in the displacement fluid in an amount sufficient to form calcium silicate hydrates.

13. The method of claim 12 wherein the hydrated lime is present in the displacement fluid in an amount in the range of from about 2% to about 15% by weight of the displacement fluid.

14. The method of claim 1 wherein the displacement fluid further comprises a viscosifying agent.

15. The method of claim 14 wherein the viscosifying agent is present in the displacement fluid in an amount sufficient to provide a desired degree of solids suspension.

16. The method of claim 14 wherein the viscosifying agent comprises hydroxyethylcellulose.

17. The method of claim 1 wherein the displacement fluid further comprises a set retarder.

18. The method of claim 17 wherein the set retarder comprises a lignosulfonate or a nucleation poisoning agent.

19. The method of claim 18 wherein the nucleation poisoning agent is a phosphonic acid derivative.

20. The method of claim 17 wherein the set retarder is present in the displacement fluid in an amount in the range of from about 0.09% to about 0.9% by weight of the displacement fluid.

21. The method of claim 1 wherein the displacement fluid further comprises a set accelerator.

22. The method of claim 21 wherein the set accelerator is present in the displacement fluid in an amount in the range of from about 0.5% to about 2% by weight of the displacement fluid.

23. The method of claim 1 wherein the displacement fluid further comprises a weighting agent, a fluid loss control additive, a defoamer, a dispersing agent, a salt, a formation conditioning agent, or a mixture thereof.

24. The method of claim 1 wherein the displacement fluid further comprises water, and wherein the water is present in the displacement fluid in an amount in the range of from about 40% to about 50% by weight of the displacement fluid; wherein the vitrified shale is present in the displacement fluid in an amount in the range of from about 40% to about 50% by weight of the displacement fluid; and wherein the hydrated lime is present in the displacement fluid in an amount in the range of from about 3% to about 10% by weight of the displacement fluid.

25. A method of producing hydrocarbons in a subterranean formation comprising the step of drilling a well bore in a subterranean formation using a drilling fluid comprising vitrified shale and hydrated lime.

26. The method of claim 25 further comprising the step of placing a casing string within the well bore, wherein the step of placing a casing string within the well bore is performed after the step of drilling a well bore in a subterranean formation using a drilling fluid comprising vitrified shale and hydrated lime.

27. The method of claim 26 further comprising the step of permitting the drilling fluid to set behind the casing string, wherein the step of permitting the drilling fluid to set behind the casing string is performed after the step of placing a casing string within the well bore.

28. The method of claim 25 wherein the drilling fluid further comprises water, and wherein the water is fresh water, salt water, brine, sea water, or a mixture thereof.

29. The method of claim 28 wherein the water is present in the drilling fluid in an amount sufficient to form a pumpable slurry.

30. The method of claim 29 wherein the water is present in the drilling fluid in an amount in the range of from about 35% to about 60% by weight of the drilling fluid.

31. The method of claim 25 wherein the vitrified shale is present in the drilling fluid in an amount sufficient to form calcium silicate hydrates.

32. The method of claim 31 wherein the vitrified shale is present in the drilling fluid in an amount in the range of from about 30% to about 60% by weight of the drilling fluid.

33. The method of claim 25 wherein the hydrated lime is present in the drilling fluid in an amount sufficient to form calcium silicate hydrates.

34. The method of claim 33 wherein the hydrated lime is present in the drilling fluid in an amount in the range of from about 2% to about 15% by weight of the drilling fluid.

35. The method of claim 25 wherein the drilling fluid further comprises a set retarder.

36. The method of claim 35 wherein the set retarder comprises a lignosulfonate, or a nucleation poisoning agent.

37. The method of claim 36 wherein the nucleation poisoning agent is a phosphonic acid derivative.

38. The method of claim 35 wherein the set retarder is present in the drilling fluid in an amount in the range of from about 0.09% to about 0.9% by weight of the drilling fluid.

39. The method of claim 25 wherein the drilling fluid further comprises a viscosifying agent.

40. The method of claim 39 wherein the viscosifying agent is present in the drilling fluid in an amount sufficient to provide a desired degree of solids suspension.

41. The method of claim 39 wherein the viscosifying agent comprises hydroxyethylcellulose.

42. The method of claim 25 wherein the drilling fluid further comprises a set accelerator.

43. The method of claim 42 wherein the set accelerator is present in the drilling fluid in an amount in the range of from about 0.5% to about 2% by weight of the drilling fluid.

44. The method of claim 25 wherein the drilling fluid further comprises a weighting agent, a fluid loss control additive, a defoamer, a dispersing agent, a salt, a formation conditioning agent, or a mixture thereof.

45. The method of claim 25 wherein the drilling fluid further comprises water, and wherein the water is present in the drilling fluid in an amount in the range of from about 40% to about 50% by weight of the drilling fluid; wherein the vitrified shale is present in the drilling fluid in an amount in the range of from about 40% to about 50% by weight of the drilling fluid; and wherein the hydrated lime is present in the drilling fluid in an amount in the range of from about 3% to about 10% by weight of the drilling fluid.

46. A settable fluid comprising vitrified shale and hydrated lime.

47. The settable fluid of claim 46 further comprising water, wherein the water is fresh water, salt water, brine, sea water, or a mixture thereof.

48. The settable fluid of claim 47 wherein the water is present in an amount sufficient to form a pumpable slurry.

49. The settable fluid of claim 48 wherein the water is present in an amount in the range of from about 35% to about 60% by weight of the settable fluid.

50. The settable fluid of claim 46 wherein the vitrified shale is present in an amount sufficient to form calcium silicate hydrates.

51. The settable fluid of claim 50 wherein the vitrified shale is present in an amount in the range of from about 30% to about 60% by weight of the settable fluid.

52. The settable fluid of claim 46 wherein the hydrated lime is present in an amount sufficient to form calcium silicate hydrates.

53. The settable fluid of claim 52 wherein the hydrated lime is present in an amount in the range of from about 2% to about 15% by weight of the settable fluid.

54. The settable fluid of claim 46 further comprising a viscosifying agent.

55. The settable fluid of claim 54 wherein the viscosifying agent is present in an amount sufficient to provide a desired degree of solids suspension.

56. The settable fluid of claim 54 wherein the viscosifying agent comprises hydroxyethylcellulose.

57. The settable fluid of claim 46 further comprising a set retarder.

58. The settable fluid of claim 57 wherein the set retarder comprises a lignosulfonate or a nucleation poisoning agent.

59. The settable fluid of claim 58 wherein the nucleation poisoning agent is a phosphonic acid derivative.

60. The settable fluid of claim 57 wherein the set retarder is present in an amount in the range of from about 0.09% to about 0.9% by weight of the settable fluid.

61. The settable fluid of claim 46 further comprising a set accelerator.

62. The settable fluid of claim 61 wherein the set accelerator is present in an amount in the range of from about 0.5% to about 2% by weight of the settable fluid.

63. The settable fluid of claim 46 further comprising a weighting agent, a fluid loss control additive, a defoamer, a dispersing agent, a salt, a formation conditioning agent, or a mixture thereof.

64. The settable fluid of claim 46 further comprising water, wherein the water is present in an amount in the range of from about 40% to about 50% by weight of the settable fluid; wherein the vitrified shale is present in an amount in the range of from about 40% to about 50% by weight of the settable fluid; and wherein the hydrated lime is present in an amount in the range of from about 3% to about 10% by weight of the settable fluid.

* * * * *